US010297826B2

(12) United States Patent
Tuduki et al.

(10) Patent No.: US 10,297,826 B2
(45) Date of Patent: May 21, 2019

(54) NONAQUEOUS ELECTROLYTE SECONDARY BATTERY

(71) Applicant: SANYO Electric Co., Ltd., Daito-shi, Osaka (JP)

(72) Inventors: Kouhei Tuduki, Hyogo (JP); Atsushi Fukui, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 140 days.

(21) Appl. No.: 15/551,843

(22) PCT Filed: Feb. 18, 2016

(86) PCT No.: PCT/JP2016/000864
§ 371 (c)(1),
(2) Date: Aug. 17, 2017

(87) PCT Pub. No.: WO2016/136211
PCT Pub. Date: Sep. 1, 2016

(65) Prior Publication Data
US 2018/0040885 A1 Feb. 8, 2018

(30) Foreign Application Priority Data
Feb. 27, 2015 (JP) ................................. 2015-038191

(51) Int. Cl.
*H01M 4/525* (2010.01)
*H01M 4/48* (2010.01)
(Continued)

(52) U.S. Cl.
CPC ............. *H01M 4/525* (2013.01); *H01M 4/36* (2013.01); *H01M 4/48* (2013.01); *H01M 4/483* (2013.01);
(Continued)

(58) Field of Classification Search
CPC ........ H01M 4/48; H01M 4/483; H01M 4/505; H01M 4/523; H01M 4/525; H01M 4/5805
(Continued)

(56) References Cited

U.S. PATENT DOCUMENTS

2007/0292764 A1    12/2007  Soma et al.
2008/0003503 A1 *   1/2008  Kawakami ............ H01G 9/155
                                                        429/231.5

(Continued)

FOREIGN PATENT DOCUMENTS

CN    102195088 A    9/2011
CN    102376948 A    3/2012
(Continued)

OTHER PUBLICATIONS

English translation of Search Report dated Nov. 29, 2018, issued in counterpart Chinese Application No. 201680011844.3. (3 pages).
(Continued)

Primary Examiner — James M Erwin
(74) Attorney, Agent, or Firm — Westerman, Hattori, Daniels & Adrian, LLP

(57) ABSTRACT

It is an object of the present invention to provide a nonaqueous electrolyte secondary battery with improved output characteristics. An example of an embodiment of the present invention provides a nonaqueous electrolyte secondary battery comprising an electrode assembly having a structure in which a positive electrode plate and a negative electrode plate are stacked with a separator therebetween. The positive electrode plate contains a lithium transition metal oxide containing tungsten as a positive electrode active material and also contains a phosphate compound. The negative electrode plate contains a graphitic carbon material and an amorphous/noncrystalline carbon material as negative elec-
(Continued)

trode active materials and includes a coating of tungsten or a tungsten compound on the surface of the amorphous/noncrystalline carbon material.

7 Claims, 1 Drawing Sheet

(51) Int. Cl.
| | |
|---|---|
| *H01M 4/36* | (2006.01) |
| *H01M 4/505* | (2010.01) |
| *H01M 4/587* | (2010.01) |
| *H01M 4/62* | (2006.01) |
| *H01M 10/0525* | (2010.01) |
| *H01M 4/58* | (2010.01) |
| *H01M 4/52* | (2010.01) |
| *H01M 10/052* | (2010.01) |
| *H01M 4/02* | (2006.01) |

(52) U.S. Cl.
CPC ........... *H01M 4/505* (2013.01); *H01M 4/523* (2013.01); *H01M 4/5805* (2013.01); *H01M 4/587* (2013.01); *H01M 4/62* (2013.01); *H01M 10/052* (2013.01); *H01M 10/0525* (2013.01); *H01M 2004/027* (2013.01); *H01M 2004/028* (2013.01); *H01M 2220/20* (2013.01); *Y02E 60/122* (2013.01); *Y02T 10/7011* (2013.01)

(58) Field of Classification Search
USPC ....................................................... 429/231.8
See application file for complete search history.

(56) References Cited

U.S. PATENT DOCUMENTS

| | | | |
|---|---|---|---|
| 2008/0131778 | A1 | 6/2008 | Watanabe et al. |
| 2009/0123839 | A1 | 5/2009 | Soma et al. |
| 2011/0217598 | A1 | 9/2011 | Kawashima et al. |
| 2012/0034503 | A1 | 2/2012 | Toyama et al. |
| 2014/0356724 | A1 | 12/2014 | Iwami |

FOREIGN PATENT DOCUMENTS

| | | | |
|---|---|---|---|
| CN | 104011924 | A | 8/2014 |
| JP | 2003-346804 | A | 12/2003 |
| JP | 2007-335331 | A | 12/2007 |
| JP | 2008-16235 | A | 1/2008 |
| JP | 2009-123463 | A | 6/2009 |
| JP | 2012-38534 | A | 2/2012 |
| JP | 2015-210891 | A | 11/2015 |
| WO | 2014/128903 | A1 | 8/2014 |

OTHER PUBLICATIONS

International Search Report dated Apr. 19, 2016, issued in counterpart International Application No. PCT/JP2016/000864 (2 pages).

\* cited by examiner

NONAQUEOUS ELECTROLYTE SECONDARY BATTERY

TECHNICAL FIELD

The present invention relates to a nonaqueous electrolyte secondary battery.

BACKGROUND ART

Nonaqueous electrolyte secondary batteries are required to have further enhanced output characteristics mainly for applications for power supplies for driving electric vehicles (EVs), hybrid electric vehicles (HEVs), electric tools, and the like.

Patent Literature 1 describes that using a positive electrode containing a positive electrode active material surface-coated with W, Mo, a Zr compound, and a phosphate compound increases safety during overcharge.

Patent Literature 2 describes that fixing carbon black to the surface of graphite as a conductive agent enhances load characteristics.

CITATION LIST

Patent Literature

PTL 1: International Publication WO 2014/128903
PTL 2: Japanese Published Unexamined Patent Application No. 2003-346804

SUMMARY OF INVENTION

Technical Problem

However, there is a problem in that output characteristics of nonaqueous electrolyte secondary batteries cannot be sufficiently improved by the above conventional techniques.

It is an object of the present invention to provide a nonaqueous electrolyte secondary battery with output characteristics more improved than ever before.

Solution to Problem

The present invention provides a nonaqueous electrolyte secondary battery including an electrode assembly having a structure in which a positive electrode plate and a negative electrode plate are stacked with a separator therebetween. The positive electrode plate contains a lithium transition metal oxide containing tungsten as a positive electrode active material and also contains a phosphate compound. The negative electrode plate contains a graphitic carbon material and an amorphous/noncrystalline carbon material unfixed to the graphitic carbon material as negative electrode active materials. A surface coating on the amorphous/noncrystalline carbon material contains tungsten or a tungsten compound.

The inventors have performed intensive investigations and, as a result, have found that the reaction overvoltage of the intercalation of Li during charge can be reduced in such a manner that a graphitic carbon material and an amorphous/noncrystalline carbon material are contained as negative electrode active materials and a coating of tungsten or a tungsten compound is formed on the surface of the amorphous/noncrystalline carbon material. Amorphous/noncrystalline carbon provided with a surface coating containing tungsten or the tungsten compound has a nobler reaction potential as compared to graphitic carbon, has a multi-orientational microstructure, and is excellent in the reaction of the intercalation of Li because of the formation of a coating with low reaction overvoltage. Furthermore, the electronic conductivity of amorphous/noncrystalline carbon can be held by combining amorphous/noncrystalline carbon with graphitic carbon, which is excellent in electrical conductivity. The current concentrates in a low-resistance portion. Therefore, in a negative electrode, the current concentrates in amorphous/noncrystalline carbon provided with the surface coating containing tungsten or the tungsten compound; hence, the battery resistance is reduced.

During charge, W contained in a positive electrode active material dissolves, migrates to the negative electrode, and precipitates on the negative electrode, whereby the coating of tungsten or the tungsten compound is formed. In this case, when a phosphate compound is present in a positive electrode containing W as a positive electrode active material, the decomposition reaction rate of W and a tungsten oxide in the positive electrode is varied by the catalysis of the phosphate compound. Since the amorphous/noncrystalline carbon material has a nobler reaction potential as compared to the graphitic carbon material, the coating of tungsten or the tungsten compound is preferentially formed on the surface of the amorphous/noncrystalline carbon material.

The term "an amorphous/noncrystalline carbon material unfixed to the graphitic carbon material" means a chemically bonded state rather than an electrically connected state and particularly means a state that, when the connection between particles is maintained with a binder or the like, the connection between the graphitic carbon material and the amorphous/noncrystalline carbon material can be broken with a solvent, such as water, for the binder, that is, a state that the separation between the graphitic carbon material and the amorphous/noncrystalline carbon material can be observed with an electron microscope.

In an embodiment of the present invention, the amorphous/noncrystalline carbon material is dispersed with respect to the graphitic carbon material.

In another embodiment of the present invention, the amorphous/noncrystalline carbon material is carbon black.

In still another embodiment of the present invention, the content of the amorphous/noncrystalline carbon material is 0.5% by weight or more with respect to the graphitic carbon material.

In still another embodiment of the present invention, the secondary particle size of the amorphous/noncrystalline carbon material is 1 µm or less.

In still another embodiment of the present invention, the lithium transition metal oxide includes at least one of Ni, Co, and Mn.

In still another embodiment of the present invention, the positive electrode mix layer contains a tungsten oxide.

Advantageous Effects of Invention

According to the present invention, the resistance of a nonaqueous electrolyte secondary battery can be reduced and output characteristics thereof can be enhanced.

DESCRIPTION OF EMBODIMENTS

Figure 1:
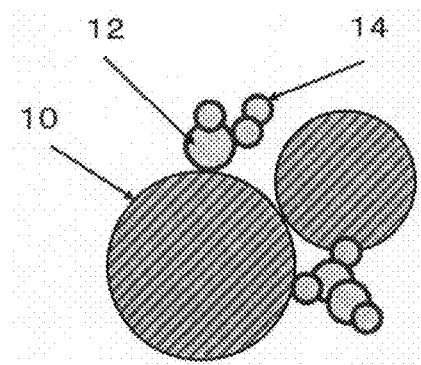
FIG. 1 is a schematic view of a negative electrode in an embodiment.

Embodiments of the present invention are described below.

A nonaqueous electrolyte secondary battery according to this embodiment has a basic configuration similar to a conventional one and includes a wound electrode assembly obtained by winding a positive electrode plate and a negative electrode plate with a separator therebetween. The outermost peripheral surface of the wound electrode assembly is covered by the separator.

The positive electrode plate includes a positive electrode core made of aluminium or an aluminium alloy. Positive electrode mix layers are formed on both surfaces of the positive electrode core such that positive electrode core-exposed portions where the core is narrowly exposed at one of lateral ends along a longitudinal direction are formed on both surfaces thereof.

The negative electrode plate includes a negative electrode core made of copper or a copper alloy. Negative electrode mix layers are formed on both surfaces of the negative electrode core such that negative electrode core-exposed portions where the core is narrowly exposed at one of lateral ends along a longitudinal direction are formed on both surfaces thereof.

The wound electrode assembly is flat and is prepared in such a manner that the positive electrode plate and the negative electrode plate are wound with the separator therebetween and are formed into a flat shape. In this operation, the positive electrode core-exposed portions are formed at one of ends of the wound electrode assembly, which is flat, so as to be wound and the negative electrode core-exposed portions are formed at the other end so as to be wound.

The wound positive electrode core-exposed portions are electrically connected to a positive electrode terminal through a positive electrode current collector. On the other hand, the wound negative electrode core-exposed portions are electrically connected to a negative electrode terminal through a negative electrode current collector. The positive electrode current collector and the positive electrode terminal are preferably made of aluminium or an aluminium alloy. The negative electrode current collector and the negative electrode terminal are preferably made of copper or a copper alloy. The positive electrode terminal is fixed to a sealing body through an insulating member. The negative electrode plate is also fixed to the sealing body through the insulating member.

The wound electrode assembly, which is flat, is housed in a prismatic enclosure in such a state that the wound electrode assembly is covered by an insulating sheet made of resin. The sealing body is brought into contact with an opening of the prismatic enclosure, which is made of metal, and a contact between the sealing body and the prismatic enclosure is laser-welded.

The sealing body has an electrolyte solution inlet. A nonaqueous electrolyte solution is poured from the electrolyte solution inlet. Thereafter, the electrolyte solution inlet is sealed with a blind rivet or the like. Of course, the nonaqueous electrolyte secondary battery is an example, may have another configuration, and may be, for example, a laminate-type nonaqueous electrolyte secondary battery formed by putting the nonaqueous electrolyte solution and the wound electrode assembly in a laminate enclosure.

Next, a positive electrode, a negative electrode, the separator, and a nonaqueous electrolyte in this embodiment are described.

(Positive Electrode)

The positive electrode is composed of, for example, the positive electrode current collector, such as metal foil, and the positive electrode mix layers formed on the positive electrode current collector. The positive electrode current collector used may be foil of a metal, such as aluminium, stable in the potential range of the positive electrode; a film including a surface layer containing the metal; or the like. The positive electrode mix layers contain a lithium transition metal oxide which is a positive electrode active material, a tungsten oxide, and a phosphate compound and preferably further contain a conductive agent and a binding agent. The positive electrode can be prepared in such a manner that, for example, positive electrode mix slurry containing the positive electrode active material, the binding agent, and the like is applied to the positive electrode current collector; wet coatings are dried and are then rolled; and the positive electrode mix layers are thereby formed on both surfaces of the current collector.

The positive electrode active material used is one containing a lithium transition metal oxide containing tungsten (W). The positive electrode mix layers contain the phosphate compound ($Li_3PO_4$ or the like). The positive electrode mix layers preferably further contain the tungsten oxide.

The lithium transition metal oxide is preferably an oxide represented by the formula $Li_{1+x}M_aO_{2+b}$ (where x+a=1, −0.2<x≤0.2, −0.1≤b≤0.1, and M includes at least one metal element selected from the group consisting of Ni, Co, Mn, and Al). Furthermore, M is preferably at least Ni. The lithium transition metal oxide preferably contains cobalt (Co) and manganese (Mn) in addition to Ni. The lithium transition metal oxide preferably contains aluminium (Al) instead of Mn in addition to Ni, Co, and Mn.

The proportion of Ni in above M is preferably 30% by mole or more. Ni is preferably contained in the form of $Ni^{3+}$. An example of a $Ni^{3+}$-containing lithium transition metal oxide is a lithium nickel-cobalt-manganate in which the molar ratio is Ni>Mn, that is, the molar ratio of Ni to Co to Mn is, for example, 3:5:2, 4:3:3, 5:2:3, 5:3:2, 6:2:2, 7:1:2, 7:2:1, or 8:1:1. In a lithium nickel-cobalt-aluminate, the molar ratio of Ni to Co to Al is, for example, 80:15:5, 85:12:3, or 90:7:3.

The following elements can be exemplified as elements other than Ni, Co, and Mn: transition metal elements such as zirconium (Zr), alkali metal elements, alkaline-earth metal elements, group 12 to 14 elements, and the like. In particular, the following elements can be exemplified: boron (B), magnesium (Mg), aluminium (Al), titanium (Ti), chromium (Cr), iron (Fe), copper (Cu), zinc (Zn), niobium (Nb), molybdenum (Mo), tantalum (Ta), tin (Sn), sodium (Na), potassium (K), barium (Ba), strontium (Sr), calcium (Ca), and the like. Zr has, for example, the function of stabilizing the crystal structure of the lithium transition metal oxide.

The positive electrode active material is in the form of, for example, secondary particles (not separated into any primary particles by ultrasonic dispersion or the like) formed by the aggregation of primary particles. The particle size of the lithium transition metal oxide is not particularly limited and is preferably 0.1 μm to 20 μm as determined by laser diffractometry. When the particle size of the lithium transition metal oxide is within this range, the good ionic conductivity and electronic conductivity of the positive electrode mix layers are likely to be both achieved. From the viewpoint of the retentivity and diffusivity of an electrolyte solution, the lithium transition metal oxide preferably has a large specific surface area as determined by a BET method.

The content of W in the lithium transition metal oxide is preferably 0.05% by mole to 10% by mole with respect to metal elements, excluding Li, in the lithium transition metal oxide, more preferably 0.1% by mole to 5% by mole, and particularly preferably 0.2% by mole to 3% by mole.

W can be contained in the oxide in such a manner that in the synthesis of the lithium transition metal oxide, for example, a composite oxide containing Ni, Co, Mn, and the like; a lithium compound such as lithium hydroxide; and W or a tungsten component such as a tungsten oxide are mixed together, followed by firing. W is preferably present in the lithium transition metal oxide in the form of a solid solution. A solid solution of W can be formed in the lithium transition metal oxide in such a manner that in the synthesis of the lithium transition metal oxide, a composite oxide containing Ni, Co, Mn, and the like and W are mixed together, followed by firing. W may be deposited at interfaces between primary particles or on the surfaces of secondary particles in the form of an oxide or metal.

The content of each of the phosphate compound and tungsten oxide in the positive electrode mix layers is preferably 0.01% by weight to 5% by weight with respect to the total weight of the positive electrode active material, more preferably 0.05% by weight to 4% by weight, and particularly preferably 0.1% by weight to 3% by weight. The particle size of each of the phosphate compound and the tungsten oxide is preferably less than the particle size of the positive electrode active material and is, for example, 25% or less of the average particle size of the positive electrode active material.

The phosphate compound, which is mixed in the positive electrode active material layers, is at least one selected from the group consisting of, for example, lithium phosphate, lithium dihydrogen phosphate, cobalt phosphate, nickel phosphate, manganese phosphate, potassium phosphate, and ammonium dihydrogen phosphate. Among these, lithium phosphate is particularly preferably used. The tungsten oxide, which is mixed in the positive electrode active material layers, is not particularly limited and is preferably $WO_3$, which is most stable and in which the oxidation number of tungsten is 6.

The phosphate compound and the tungsten oxide can be attached to, for example, the surfaces of particles of the active material in such a manner that the phosphate compound and the tungsten oxide are mechanically mixed with the positive electrode active material. Alternatively, the phosphate compound and the tungsten oxide may be mixed in the positive electrode mix layers in such a manner that the phosphate compound and the tungsten oxide are added in a step of preparing positive electrode mix slurry by kneading the conductive agent and the binding agent. The phosphate compound and the tungsten oxide are preferably added to the positive electrode mix layers by the former method. This efficiently allows the phosphate compound and the tungsten oxide to be present near the surfaces of the active material particles.

The presence of the phosphate compound and the tungsten oxide in the positive electrode mix layers enables the reaction rate of dissolving a portion of a tungsten compound to be adjusted, thereby forming a surface coating on the negative electrode in a good form.

The conductive agent is used to increase the electrical conductivity of the positive electrode mix layers. Examples of the conductive agent include carbon materials such as carbon black, acetylene black, Ketjenblack, and graphite. These may be used alone or in combination.

The binding agent is used to maintain the good contact between the positive electrode active material and the conductive agent and to increase the adhesion of the positive electrode active material and the like to a surface of the positive electrode current collector. Examples of the binding agent include fluorinated resins such as polytetrafluoroethylene (PTFE) and polyvinylidene fluoride (PVdF), polyacrylonitrile (PAN), polyimide resins, acrylic resins, and polyolefin resins. These resins may be used in combination with carboxymethylcellulose (CMC), a salt thereof (that may be CMC-Na, CMC-K, CMC-$NH_4$, a partially neutralized salt, or the like), polyethylene oxide (PEO), and/or the like. These may be used alone or in combination.

(Negative Electrode)

The negative electrode is composed of, for example, the negative electrode current collector made of metal foil or the like and the negative electrode mix layers formed on the current collector. The negative electrode current collector used may be foil of a metal, such as copper, stable in the potential range of the negative electrode; a film including a surface layer containing the metal; or the like. The negative electrode mix layers preferably contain a negative electrode active material and a binding agent. The negative electrode can be prepared in such a manner that, for example, negative electrode mix slurry containing the negative electrode active material, the binding agent, and the like is applied to the negative electrode current collector; wet coatings are dried and are then rolled; and the negative electrode mix layers are thereby formed on both surfaces of the current collector.

The negative electrode active material contains a graphitic carbon material capable of reversely storing and releasing lithium ions and amorphous/noncrystalline carbon. The term "amorphous/noncrystalline carbon" as used herein refers to amorphous carbon, noncrystalline carbon, or a mixture of amorphous carbon and noncrystalline carbon.

The graphitic carbon material is a carbon material with a developed graphite crystal structure and includes natural graphite and synthetic graphite. These may be flaky or may have been spheroidized. Synthetic graphite is prepared in such a manner that a raw material such as petroleum, coal pitch, or coke is heat-treated at 2,000° C. to 3,000° C. or higher in an Acheson furnace, a graphite heater, or the like. The d(002) interplanar spacing determined by X-ray diffraction is preferably 0.338 nm or less. The crystal thickness (Lc (002)) in the c-axis direction is preferably 30 nm to 1,000 nm.

The term "amorphous/noncrystalline carbon" as used herein also refers to a carbon material with an undeveloped graphite crystal structure and amorphous or microcrystalline carbon with a turbostratic structure and particularly means that the d(002) interplanar spacing determined by X-ray diffraction is 0.342 nm or more. Hard carbon (non-graphitizable carbon), soft carbon (graphitizable carbon), carbon black, carbon fibers, activated carbon, and the like are cited. Methods for producing these are not particularly limited. These are obtained by carbonizing, for example, resins or resin compositions. The following materials can be used: phenolic thermosetting resins, thermoplastic resins such as polyacrylonitrile, petroleum or coal tar, petroleum or coal pitch, and the like. For example, carbon black is obtained by pyrolyzing a hydrocarbon serving as a raw material. Pyrolysis processes include thermal processes, acetylene decomposition processes, and the like. Incomplete combustion processes include contact processes, lamp black processes, gas furnace processes, oil furnace processes, and the like. Examples of carbon black produced by these processes include acetylene black, Ketjenblack, thermal black, and furnace black. These amorphous/noncrystalline carbons may be surface-coated with different noncrystalline or amorphous carbon.

The mixing ratio between the graphitic carbon material and amorphous/noncrystalline carbon is not particularly limited. The proportion of amorphous/noncrystalline carbon, which is excellent in Li storage performance, is preferably high. The proportion of amorphous/noncrystalline carbon in the active material is preferably 0.5% by weight or more and more preferably 2% by weight or more. However, when amorphous/noncrystalline carbon is too much, a reduction in electronic conductivity is anticipated. Therefore, the upper limit is preferably determined in consideration of this.

It is preferable that amorphous/noncrystalline carbon is uniformly dispersed in the negative electrode, because this leads to the relaxation of the current density distribution in the whole electrode plate and enables a reduction in resistance.

The term "dispersed" as used herein means that in the case where an arbitrary portion of the negative electrode is observed with a SEM or the like, amorphous/noncrystalline carbon is not intensively present in any site. A portion where amorphous/noncrystalline carbon is intensively present in a specific site is defined as an aggregate. In a dispersed state, the size of the aggregate is not excessively larger than the primary particle size and the ratio of the primary particle size of amorphous/noncrystalline carbon to the secondary particle size of the aggregate preferably ranges from 1:1 to 1:100 and more preferably 1:1 to 1:50. When the primary particle size of amorphous/noncrystalline carbon is about 20 nm to 50 nm, the secondary particle size thereof is preferably 1 μm or less.

A dispersion method is not particularly limited and a disperser usually used to mix the carbon material with water serving as a dispersion medium or to disperse a pigment can be used. The following machines are cited: for example, media-type dispersers such as bead mills to which media such as glass beads or zirconia beads are added, sand mills, ball mills, dissolvers, sand grinders, ball mills, attritors, and vibration mills; kneaders; roller mills; stone mills; Ishikawa-type Raikai machines; homogenizers ("Cleamix" manufactured by M Technique Co., Ltd., "Filmix" manufactured by PRIMIX Corporation, and the like); wet jet mills; ultrasonicators; and the like. These dispersion machines may be used in combination.

In particular, a water-soluble organic polymer may be used to disperse a highly oleophilic carbon material in an aqueous solvent. For example, chemically modified cellulose typified by carboxymethylcellulose is cited. Carboxy groups and hydroxy groups present on the surfaces of individual carbon particles interact with each other to facilitate dispersion, thereby enabling stability in a dispersed state to be increased.

A known compound such as a surfactant may be added as required. The surfactant is electrically or chemically adsorbed on the surface of the carbon material, thereby enabling dispersion stability to be enhanced. Examples of the surfactant include sulfonate anionic surfactants such as alkylbenzenesulfonic acids and nonionic surfactants such as polyoxyethylene alkylphenyl ethers. It is preferable that these surfactants have a low boiling or sublimation point and can be volatilized by drying or less, because these surfactants can serve as resistance components for electronic conductivity.

The primary particle size of amorphous/noncrystalline carbon is preferably small from the viewpoint of the diffusion length of Li. The specific surface area thereof is preferably large because the reaction surface area for the intercalation of Li is large. However, an excessively large specific surface area causes an excessive reaction, leading to an increase in resistance. Therefore, the specific surface area of amorphous/noncrystalline carbon is preferably 5 $m^2/g$ to 200 $m^2/g$. In order to reduce the excessive specific surface area, the primary particle size thereof is preferably 20 nm to 1,000 nm and more preferably 40 nm to 100 nm. Amorphous/noncrystalline carbon preferably has no hollow structure in which a hollow is present in particles.

As is the case with the positive electrode, the binding agent used may be a fluorinated resin, PAN, a polyimide resin, an acrylic resin, a polyolefin resin, or the like. In the case of using an aqueous solvent to prepare the negative electrode mix slurry, the following material is preferably used: styrene-butadiene rubber (SBR), CMC, a salt thereof, polyacrylic acid (PAA), a salt thereof (that may be PAA-Na, PAA-K, or a partially neutralized salt), polyvinyl alcohol (PVA), or the like.

(Separator)

The separator used is a porous sheet having ionic permeability and insulation properties. Examples of the porous sheet include microporous thin films, fabrics, and nonwoven fabrics. The separator is preferably made of an olefin resin such as polyethylene or polypropylene or cellulose. The separator may be a laminate including a cellulose fiber layer and a thermoplastic resin fiber layer made of the olefin resin or the like.

(Nonaqueous Electrolyte)

An electrolyte is a nonaqueous electrolyte containing, for example, a nonaqueous solvent and an electrolyte salt dissolved in the nonaqueous solvent. The nonaqueous electrolyte is not limited to any liquid electrolyte (nonaqueous electrolyte solution) and may be a solid electrolyte containing a gel-like polymer. The following solvents can be used for the nonaqueous solvent: for example, esters, ethers, nitriles, amides such as dimethylformamide, and mixtures of two or more of these solvents. A sulfo group-containing compound such as propanesultone may be used. The nonaqueous solvent may contain a halogen-substituted compound obtained by substituting hydrogen in at least one of these solvents with an atom of a halogen such as fluorine.

Linear carboxylates can be exemplified as the esters. The linear carboxylates are not particularly limited and are preferably linear carboxylates containing three to five carbon atoms. Examples thereof include methyl propionate, ethyl propionate, methyl acetate, ethyl acetate, and propyl acetate.

Examples of the esters (other than the linear carboxylates) include cyclic carbonates such as ethylene carbonate (EC), propylene carbonate (PC), butylene carbonate, and vinylene carbonate (VC); linear carbonates such as dimethyl carbonate (DMC), ethyl methyl carbonate (EMC), diethyl carbonate (DEC), methyl propyl carbonate, ethyl propyl carbonate, and methyl isopropyl carbonate; and cyclic carboxylates such as γ-butyrolactone (GBL) and γ-valerolactone (GVL).

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, and crown ethers and linear ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

Examples of the nitriles include acetonitrile, propionitrile, butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile.

Examples of the halogen-substituted compound include fluorinated cyclic carbonates such as fluoroethylene carbonate (FEC), fluorinated linear carbonates, and fluorinated linear carboxylates such as methyl fluoropropionate (FMP).

The electrolyte salt is preferably a lithium salt. Examples of the lithium salt include $LiBF_4$; $LiClO_4$; $LiPF_6$; $LiAsF_6$; $LiSbF_6$; $LiAlCl_4$; LiSCN; $LiCF_3SO_3$; $LiC(C_2F_5SO_2)$; $LiCF_3CO_2$; $Li(P(C_2O_4)F_4)$; $Li(P(C_2O_4)F_2)$; $LiPF_{6-x}(C_nF_{2n+1})_x$ (where $1<x<6$ and n is 1 or 2); $LiB_{10}Cl_{10}$; LiCl; LiBr; LiI; chloroborane lithium; lithium lower aliphatic carboxylates; borates such as $Li_2B_4O_7$, $Li(B(C_2O_4)_2)$ [lithium-bisoxalate borate (LiBOB)], and $Li(B(C_2O_4)F_2)$; and imide salts such as $LiN(FSO_2)_2$ and $LiN(C_lF_{2l+1}SO_2)(C_mF_{2m+1}SO_2)$ {where l and m are integers greater than or equal to 1}. The lithium salt used may be one of these salts or a mixture of some of these salts. Among these salts, at least one fluorine-containing lithium salt is preferably used from the viewpoint of ionic conductivity, electrochemical stability, and the like. For example, $LiPF_6$ is preferably used. In particular, from the viewpoint that a coating stable in a high-temperature environment is formed on a surface of the negative electrode, the fluorine-containing lithium salt and a lithium salt containing oxalato complex anions (for example, LiBOB) are preferably used in combination. The concentration of the lithium salt is preferably 0.8 mol to 1.8 mol per liter of the nonaqueous solvent and more preferably 1.2 mol to 1.5 mol in order to achieve high output.

In this embodiment, a portion of W contained in the positive electrode active material dissolves during the charge of the battery, migrates to the negative electrode, and precipitates on a surface of the negative electrode. By the dissolution and precipitation, W or the tungsten compound is finely and uniformly precipitated on the surface of the negative electrode active material. Amorphous/noncrystalline carbon in the negative electrode has a nobler reaction potential as compared to graphitic carbon and therefore the formation of a surface coating occurs preferentially in a region where amorphous/noncrystalline carbon is present. A surface coating containing W is formed on amorphous/noncrystalline carbon in the negative electrode as described above, thereby enabling the reaction overvoltage of the intercalation of Li during charge to be reduced.

Since the phosphate compound is present in the positive electrode, which contains W as a positive electrode active material, the decomposition reaction rate of W or the tungsten compound in the positive electrode is varied by the catalysis of the phosphate compound. Therefore, the presence of the phosphate compound and W or the tungsten compound in the positive electrode enables the surface coating containing W to be formed on the negative electrode active material when the electrolyte solution and Li ions are decomposed on the negative electrode to form a surface coating.

In initial charge, leaving for a certain period under high-temperature conditions after performing charge in a certain range enables a surface coating to be effectively formed on the negative electrode. In particular, it is preferable that a battery below is charged to 40% to 80% of the rated capacity thereof and is left for 10 hours to 30 hours at a temperature of 45° C. to 80° C.

Amorphous/noncrystalline carbon provided with a surface coating containing W or the tungsten compound has a nobler reaction potential as compared to graphitic carbon, has a multi-orientational microstructure, and is excellent in the reaction of the intercalation of Li because the coating has low reaction overvoltage. Furthermore, the electronic conductivity of amorphous/noncrystalline carbon can be held by mixing graphitic carbon, which is excellent in electrical conductivity, into the negative electrode active material. The current concentrates in a low-resistance portion. Therefore, in the negative electrode mix, the current concentrates more in amorphous/noncrystalline carbon provided with the surface coating containing W; hence, the battery resistance can be reduced.

As amorphous/noncrystalline carbon provided with the surface coating containing W or the tungsten compound is more uniformly present in the negative electrode mix in the in-plane direction of the negative electrode in a larger amount, amorphous/noncrystalline carbon provided therewith is excellent in the intercalation of Li. Therefore, in order to maintain electronic conductivity and in order to most exhibit an effect, it is preferable that amorphous/noncrystalline carbon is prevented from aggregating and is dispersed. The specific surface area involved in the reaction of amorphous/noncrystalline carbon is preferably large.

FIG. 1 is a schematic view of the negative electrode in this embodiment. An amorphous/noncrystalline carbon material 12 is dispersedly present on the surface of the graphitic carbon material 10. The amorphous/noncrystalline carbon material 12 is in contact with the graphitic carbon material 10 without being fixed and is in an electrically connected state. Tungsten dissolves during the charge of the battery and migrates to the negative electrode, whereby a coating 14 of the tungsten compound is formed on the surface of the amorphous/noncrystalline carbon material 12.

Examples are described below.

EXAMPLES

Experiment Example 1

[Preparation of Positive Electrode Active Material]

A nickel-cobalt-manganese composite oxide was prepared by firing a nickel-cobalt-manganese composite hydroxide that was obtained in such a manner that $NiSO_4$, $CoSO_4$, and $MnSO_4$ were mixed in an aqueous solution and were co-precipitated. Next, the composite oxide, lithium hydroxide, and tungsten oxide ($WO_3$) were mixed using a Raikai mortar such that the molar ratio of lithium to a combination of nickel, cobalt, and manganese that were all transition metals to tungsten was 1.2:1:0.005. The mixture was fired in air, followed by crushing, whereby a lithium transition metal oxide containing W and a positive electrode active material were obtained. The obtained positive electrode active material was subjected to elemental analysis by ICP, resulting in that the molar ratio of each element to the whole transition metals was Ni:Co:Mn:W=47:27:26:0.5.

[Preparation of Positive Electrode]

The positive electrode active material, $WO_3$, and $Li_3PO_4$ were mixed together, the amount of $WO_3$ being 0.5% by weight of the active material, the amount of $Li_3PO_4$ being 1% by weight of the active material. The mixture, carbon black, and polyvinylidene fluoride (PVDF) were mixed at a weight ratio of 91:7:2. N-methyl-2-pyrrolidone (NMP) serving as a dispersion medium was added to this mixture, followed by kneading, whereby positive electrode mix slurry was prepared. Next, the positive electrode mix slurry was applied to aluminium foil that was a positive electrode current collector and a wet coating was dried, whereby a positive electrode mix layer was formed on the aluminium foil. The current collector provided with the mix layer was cut into a predetermined size, followed by rolling and attaching an aluminium tab thereto, whereby a positive electrode was obtained.

[Preparation of Negative Electrode]

Carboxymethylcellulose (CMC) that was a binding agent, carbon black (CB), and water were mixed for 30 minutes using an Ishikawa-type Raikai machine, whereby a CB dispersion was prepared. Next, the prepared CB dispersion, a graphite powder that was a negative electrode active material, CMC, styrene-butadiene rubber (SBR), and water were mixed, whereby negative electrode mix slurry was prepared. In this operation, the negative electrode mix slurry was prepared such that the mass ratio of a combination of graphite and CB to CMC to SBR was 98.9:0.7:0.4 and the mass ratio of graphite to CB was 93:7.

Next, the negative electrode mix slurry was applied to a negative electrode current collector made of copper foil, followed by drying, whereby a negative electrode mix layer was formed. The current collector provided with the mix layer was cut into a predetermined size, followed by rolling and attaching a nickel tab thereto, whereby a negative electrode was obtained.

Figure 2:
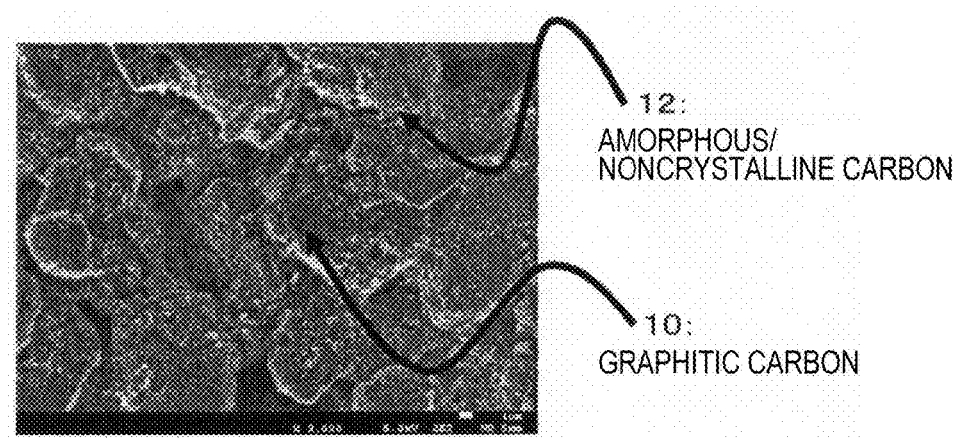
FIG. 2 is an illustration showing a SEM photograph of a negative electrode in an embodiment.

FIG. 2 shows SEM (scanning electron microscope) measurement results of a surface of a negative electrode plate. It is clear that an amorphous/noncrystalline carbon material is uniformly dispersed over the negative electrode plate in a size of 1 μm or less.

[Preparation of Nonaqueous Electrolyte Solution]

Ethylene carbonate (EC), ethyl methyl carbonate (EMC), and dimethyl carbonate (DMC) were mixed at a volume ratio of 3:3:4. $LiPF_6$ was dissolved in the solvent mixture at a concentration of 1.2 mol/L, whereby a nonaqueous electrolyte solution was prepared.

[Preparation of Test Cell]

The single positive electrode, the single negative electrode, and a single separator composed of a microporous member made of polyethylene were used to prepare a wound electrode assembly. First, the positive electrode and the negative electrode were arranged opposite to each other in such a state that the positive electrode and the negative electrode were insulated with the separator. The positive electrode, the negative electrode, and the separator were spirally wound using a cylindrical core. In this operation, each of a positive electrode current-collecting tab and a negative electrode current-collecting tab was placed so as to be located on the outermost periphery in a corresponding one of the electrodes. Thereafter, the core was removed, whereby a wound electrode assembly was prepared.

The nonaqueous electrolyte solution and wound electrode assembly prepared as described above were put in a laminate enclosure made of aluminium in a glove box under an argon atmosphere, whereby a laminate-type nonaqueous electrolyte secondary battery was prepared and was defined as Test Cell A1.

Experiment Example 2

Test Cell B1 was prepared in substantially the same manner as that used in Experiment Example 1 except that no $Li_3PO_4$ was mixed in a positive electrode active material.

Experiment Example 3

Test Cell B2 was prepared in substantially the same manner as that used in Experiment Example 1 except that firing was performed without mixing $WO_3$ as a positive electrode active material, a lithium transition metal oxide in which the ratio of each transition metal to all transition metals was Ni:Co:Mn=35:35:30, and none of $Li_3PO_4$ and $WO_3$ was mixed.

Experiment Example 4

Test Cell B3 was prepared in substantially the same manner as that used in Experiment Example 1 except that no carbon black was mixed in the preparation of negative electrode mix slurry.

Experiment Example 5

Test Cell B4 was prepared in substantially the same manner as that used in Experiment Example 2 except that no carbon black was mixed in the preparation of negative electrode mix slurry.

Experiment Example 6

Test Cell B5 was prepared in substantially the same manner as that used in Experiment Example 3 except that no carbon black was mixed in the preparation of negative electrode mix slurry.

[Evaluation of Degree of Dispersion of Amorphous/Noncrystalline Carbon]

The size of amorphous/noncrystalline carbon was measured in such a manner that a surface of the negative electrode used in Test Cell A1 was observed using a SEM. In the observation of the particle size using the SEM, an arbitrary 10 μm×8 μm region was observed and the particle size of amorphous/noncrystalline carbon was measured. When the size of 90% of particles in this region was less than or equal to a certain size, this size was defined as the secondary particle size.

[Evaluation of Output Characteristics]

At a temperature of 25° C., each test cell was charged to 60% of the rated capacity thereof at a current density of 0.2 l·t (C rate). The test cell was left at 75° C. for 22 hours. Thereafter, the test cell was charged to 4.1 V in a constant current mode and was further charged with a constant voltage of 4.1 V in a constant voltage mode until the current density reached 0.05 l·t (C rate). The discharge capacity determined by discharging the test cell to 2.5 V at a current density of 0.2 l·t (C rate) at a temperature of 25° C. was defined as the rated capacity of the test cell.

Next, the test cell was charged to half the rated capacity at a current density of 0.2 l·t. Thereafter, the test cell was discharged at a current density of 0.2 l·t to 1.5 l·t at −30° C. for 10 seconds, followed by measuring the voltage after 10 seconds.

Voltage measurements were plotted against the current density, followed by calculating the resistance using the value as a slope.

The rate of reduction in resistance of A1 and B1 and the rate of reduction in resistance of B3 and B4 were calculated on the basis of the resistance of B2 and the resistance of B5, respectively, by the following equation:

Rate of reduction in resistance=resistance of test cell/resistance of test cell (reference cell).

Results are shown in Table 1.

TABLE 1

| Cell No | Negative electrode | | | Positive electrode | | | Low-temperature IV resistance mΩ | Rate of reduction in low-temperature IV resistance |
| | Addition of CB | Additive amount | Secondary particle size of CB | Containing of W | | | | |
| | | | | Active material Containing of W | Mix Addition of WO$_3$ | Containing of Li$_3$PO$_4$ | | |
|---|---|---|---|---|---|---|---|---|
| A1 | Added | 7% by weight | Less than 1 μm | Contained | Added | Contained | 11.4 | 0.79 |
| B1 | Added | 7% by weight | Less than 1 μm | Contained | Added | Not contained | 13.5 | 0.93 |
| B2 | Added | 7% by weight | Less than 1 μm | Not contained | Not added | Not contained | 14.5 | 1.00 |
| B3 | Not added | — | — | Contained | Added | Contained | 13.6 | 0.87 |
| B4 | Not added | — | — | Contained | Added | Not contained | 13.9 | 0.89 |
| B5 | Not added | — | — | Not contained | Not added | Not contained | 15.7 | 1.00 |

As is clear from Table 1, Test Cell A1 of an experiment example (W is contained in the positive electrode, WO$_3$ is mixed, Li$_3$PO$_4$ is mixed, and carbon black (CB) is added to the negative electrode) can achieve a more excellent reduction in resistance as compared to Test Cells B1 and B2 of corresponding experiment examples. This is probably because the presence of a W compound and a phosphate compound in a positive electrode enables a low-resistance coating to be formed on amorphous/noncrystalline carbon in a negative electrode and has been capable of achieving the reduction in resistance of a battery at low temperature. From the above, it has been confirmed that Test Cell A1 has enhanced output characteristics.

In Test Cells B3 to B5, no amorphous/noncrystalline carbon is present in the negative electrodes. Therefore, it has been confirmed that no low-resistance coating is formed on amorphous/noncrystalline carbon and the reduction in resistance of a battery at low temperature is not sufficiently achieved.

Experiment Example 7

A test cell was prepared in the same manner as that used in Experiment Example 1. Thereafter, at a temperature of 25° C., the test cell was charged to 60% of the rated capacity thereof at a current density of 0.2 l·t (C rate). The test cell was left at 75° C. for 22 hours. Next, the test cell was discharged to 2.5 V at a current density of 0.2 l·t (C rate) in a constant voltage mode.

Thereafter, the cell was disassembled. Test Cell C1 was similarly prepared using a negative electrode that was charged and was discharged and a positive electrode which had substantially the same specifications as those of the positive electrode used in Experiment Example 1 except that no WO$_3$ was mixed and which contained an uncharged positive electrode active material, followed by measuring the resistance thereof at low temperature.

Experiment Example 8

Test Cell D1 was prepared in substantially the same manner as that used in Experiment Example 7 except that a positive electrode containing none of a W compound and Li$_3$PO$_4$ was used as an undisassembled positive electrode, followed by measuring the resistance thereof at low temperature.

Results are shown in Table 2.

The rate of reduction in resistance of C1 was calculated on the basis of the resistance of D1.

TABLE 2

| Cell No | Undisassembled positive electrode | | | Disassembled positive electrode | | | Low-temperature IV resistance mΩ | Rate of reduction in low-temperature IV resistance |
| | Containing of W | | | Containing of W | | | | |
| | Active material Containing of W | Mix Addition of WO$_3$ | Containing of Li$_3$PO$_4$ | Active material Containing of W | Mix Addition of WO$_3$ | Containing of Li$_3$PO$_4$ | | |
|---|---|---|---|---|---|---|---|---|
| C1 | Contained | Added | Added | Contained | Not added | Contained | 20.8 | 0.95 |
| D1 | Not contained | Not added | Not contained | Contained | Not added | Contained | 21.9 | 1.00 |

As is clear from Table 2, in the case where a positive electrode in which a W compound and a phosphate compound are present is not used during initial charge, the reduction in resistance of a battery cannot be achieved even if the positive electrode in which the W compound and the phosphate compound are present is used thereafter. A surface coating is formed on a negative electrode in which amorphous/noncrystalline carbon is present mainly during initial charge and a subsequent high-temperature leaving treatment. Using the positive electrode in which the W compound and the phosphate compound are present to perform these treatments allows a low-resistance surface coating to be formed on the negative electrode in which amorphous/noncrystalline carbon is present, thereby enabling the reduction in resistance of a battery to be achieved.

Experiment Example 9

Test Cell E1 was prepared in substantially the same manner as that used in Experiment Example 1 except that the amount of mixed carbon black was 0.5% by weight of graphite.

Experiment Example 10

Test Cell E2 was prepared in substantially the same manner as that used in Experiment Example 1 except that the amount of mixed carbon black was 2% by weight of graphite.

Experiment Example 11

Test Cell E3 was prepared in substantially the same manner as that used in Experiment Example 1 except that the Raikai time was 5 minutes when a CB dispersion was prepared.

Experiment Example 12

Test Cell E4 was prepared in substantially the same manner as that used in Experiment Example 1 except that no $WO_3$ was mixed in a positive electrode active material.

The resistance determined by testing each cell is shown in Table 3.

The rate of reduction in resistance of A1 and E1 to E4 was calculated on the basis of the resistance of B3.

As is clear from Table 3, as the amount of mixed amorphous/noncrystalline carbon is larger, a further reduction in resistance can be achieved.

As the secondary particle size of amorphous/noncrystalline carbon is more uniformly dispersed, a further reduction in resistance can be achieved.

The reaction overvoltage of the intercalation of Li during charge can be reduced by forming a coating of tungsten or a tungsten compound on an amorphous/noncrystalline carbon material. Therefore, as the amount of the mixed amorphous/noncrystalline carbon material is larger, the secondary particle size of the amorphous/noncrystalline carbon material is smaller, and the amorphous/noncrystalline carbon material is more uniformly dispersed in a negative electrode, the density of the current flowing through the negative electrode is more uniformly alleviated and a further reduction in resistance can be achieved.

Furthermore, it is clear that a further reduction in resistance can be achieved in such a manner that a tungsten compound in a positive electrode mix is mixed with W during the firing of an active material and is mixed with $WO_3$ after firing. This suggests that since $WO_3$ is present in the positive electrode mix, $WO_3$ is decomposed during charge, the formation of a coating of tungsten or the tungsten compound on amorphous/noncrystalline carbon in a negative electrode is promoted, and a further reduction in resistance can be achieved.

The added tungsten compound may be $W_2O_5$ rather than $WO_3$.

As described above, in this embodiment, the resistance of a nonaqueous electrolyte secondary battery can be reduced and output characteristics thereof can be enhanced.

REFERENCE SIGNS LIST

10 Graphitic carbon material
12 Amorphous/noncrystalline carbon material
14 W-containing coating

The invention claimed is:
1. A nonaqueous electrolyte secondary battery comprising an electrode assembly having a structure in which a positive electrode plate and a negative electrode plate are stacked with a separator therebetween,

TABLE 3

| | Negative electrode | | | Positive electrode | | | | Rate of reduction in low-temperature IV resistance |
|---|---|---|---|---|---|---|---|---|
| | | | | Containing of W | | | | |
| Cell No | Addition of CB | Additive amount | Secondary particle size of CB | Active material Containing of W | Mix Addition of $WO_3$ | Containing of $Li_3PO_4$ | Low-temperature IV resistance | |
| A1 | Added | 7% by weight | Less than 1 μm | Contained | Added | Contained | 11.4 | 0.84 |
| E1 | Added | 0.5% by weight | Less than 1 μm | Contained | Added | Contained | 12.7 | 0.93 |
| E2 | Added | 2% by weight | Less than 1 μm | Contained | Added | Contained | 12.5 | 0.92 |
| E3 | Added | 7% by weight | 1 μm | Contained | Added | Contained | 12.0 | 0.88 |
| E4 | Added | 7% by weight | Less than 1 μm | Contained | Not added | Contained | 12.6 | 0.93 |
| B3 | Not added | — | — | Contained | Added | Contained | 13.6 | 1.00 | wherein the positive electrode plate contains a lithium transition metal oxide containing tungsten as a positive electrode active material and also contains a phosphate compound, the negative electrode plate contains a graphitic carbon material and an amorphous/noncrystalline carbon material unfixed to the graphitic carbon material as negative electrode active materials, and a surface coating on the amorphous/noncrystalline carbon material contains tungsten or a tungsten compound.

2. The nonaqueous electrolyte secondary battery according to claim 1, wherein the positive electrode plate further contains a tungsten oxide.

3. The nonaqueous electrolyte secondary battery according to claim 2, wherein the tungsten oxide $WO_3$.

4. The nonaqueous electrolyte secondary battery according to claim 1, wherein the amorphous/noncrystalline carbon material is dispersed with respect to the graphitic carbon material.

5. The nonaqueous electrolyte secondary battery according to claim 1, wherein the amorphous/noncrystalline carbon material is carbon black.

6. The nonaqueous electrolyte secondary battery according to claim 1, wherein the content of the amorphous/noncrystalline carbon material is 0.5% by weight or more with respect to the graphitic carbon material.

7. The nonaqueous electrolyte secondary battery according to claim 1, wherein the secondary particle size of the amorphous/noncrystalline carbon material is 1 μm or less.

* * * * *